Patented Apr. 12, 1938

2,114,166

UNITED STATES PATENT OFFICE 2,114,166

ALKALI SILICATE CEMENT

Peter de Leeuw, Niagara Falls, N. Y., assignor, by mesne assignments, to The Carborundum Company, Niagara Falls, N. Y., a corporation of Delaware No Drawing. Application October 4, 1935, Serial No. 43,509

5 Claims. (Cl. 106—30)

This invention relates to an alkali silicate cement of novel composition and having improved resistance to the deteriorating effect of water.

Alkali silicate cements have been used previously in bonding granular material into unitary articles and in the formation of composite structures, as a cement for joining the adjacent surfaces of the unitary elements of the structures. For example, sodium silicate cements have been used previously in the formation of bonded abrasive articles. As the use of abrasive articles bonded in this manner generally involves their exposure to moisture the natural solubility of sodium silicate has limited the usefulness of such articles because on exposure to water their bond structure has deteriorated with the result that the abrasive grains have been loosened and lost from the bonded article before the expiration of their useful lives.

It has been the practice to add zinc oxide to a sodium silicate mix to improve the water resistance of the cement but the results, while representing an improvement, have been unsatisfactory. Aside from the fact that the addition of zinc oxide introduces mechanical difficulties in the use of the cement the loss in strength in bonded abrasive articles using the sodium silicate cement thus modified still has been 20 to 40% after 16 hours immersion in water.

The mechanical difficulties due to the use of zinc oxide as a modifier in the sodium silicate cement reside chiefly in the difficulty of handling mixes during the molding operation due to the congealing of the mix and, in the case of bonded abrasive articles, bloating and cracking during the baking process, and non-uniformity in the finished products.

This invention contemplates the provision of an alkali silicate cement comprising an alkali silicate and a modifier comprising magnesium oxide or magnesia and amorphous silica. The invention also contemplates the use of a cement containing a modifier comprising the above named ingredients with the addition of zinc oxide and/or an inert filler such as comminuted flint. In connection with this invention it has been found that such a cement has a high dry strength and a high water resistance.

These valuable properties are of particular importance in bonded articles, especially abrasive wheels whose use involves high peripheral speed and contact with water. The invention will be further described and illustrated by reference to the manufacture of abrasive articles, but it will be understood that this is merely an illustration of the use of the new cement which has the same advantages and capabilities when used for cementing together the units of any composite structure, for example, the units of a segmental pulp wheel, or when used in bonding non-abrasive granular material into desired shapes.

Example I 5400 grams of fused alumina—80 mesh; 100 grams of magnesium oxide; and 140 grams of diatomaceous earth are intimately mixed, and then 60 cc. of water are added to the mixture and distributed uniformly throughout the mass. Then 360 grams of sodium silicate 60° Bé. are poured into the batch and the mass is mixed until a homogeneous mixture is obtained. The mass is then pressed into the desired shape and after standing at room temperature for about 1 hour is placed in the baking oven. The temperature of the baking oven is gradually raised to 385° F. and kept at that point for at least 4 hours, the length of the time of baking depending upon the size and shape of the particular article under treatment.

By following the procedure outlined above, a very strong and water resistant article is obtained. For example, test bars made up according to the above procedure and tested for transverse strength exhibited a modulus of rupture in the dry condition of 2690 lbs. In the wet condition after being immersed in water for 16 hours, the bars exhibited a modulus of rupture of 2700 lbs.

These improved properties represent a substantial improvement over prior processes. For example, test bars made up in accordance with the process heretofore commercially used exhibited a much lower strength and water resistance. Test bars made up according to the prior process exhibited a modulus of rupture in the dry condition of 2120 lbs., and in the wet condition after 16 hours immersion in water they exhibited a modulus of rupture of 1640 lbs., representing a loss of 22.6%.

Slightly higher strength with equally good water resistance may be obtained by substituting zinc oxide in the formula under Example I for part of the magnesium oxide or the diatomaceous earth or both. The use of zinc oxide in the modifier may be illustrated by the following:

Example II 5400 grams of fused alumina—80 mesh; 120 grams of magnesium oxide; 60 grams of diatomaceous earth; 60 grams of zinc oxide; 360 grams of sodium silicate 60° Bé.; and 45 cc. of water are intimately mixed according to the details set forth under Example I. That is, the dry ingredients are mixed intimately first followed by the addition successively of the wet ingredients, followed by baking under the same conditions as outlined in Example I. Test bars made up by this method had a modulus of rupture in the dry condition of 2990 lbs. and in the wet condition, after 16 hours immersion in water, of 2990 lbs.

In either of the formulae of Example I or Example II an inert filler may be employed without reducing the desirable properties of the bond appreciably. Such a filler may be, for example, crystalline silica in finely divided form, for example, flint.

The use of such a filler is illustrated in the following:

*Example III*

5400 grams of fused alumina—80 mesh; 90 grams of magnesium oxide; 90 grams of diatomaceous earth; 60 grams of comminuted flint; 360 grams of sodium silicate 60° Bé.; and 45 cc. of water are thoroughly mixed, formed into the desired shape, and baked as outlined under Example I. Test bars made up by that method and with the formula given above had a modulus of rupture in the dry condition of 2610 lbs. and in the wet condition, after 16 hours immersion in water, a modulus of rupture of 2600 lbs., representing a loss of .4%.

The use of both zinc oxide and an inert filler as additions to the modifier of the sodium silicate is illustrated by the following:

*Example IV*

5400 grams of fused alumina—80 mesh; 100 grams of magnesium oxide; 50 grams of diatomaceous earth; 50 grams of zinc oxide; 40 grams of comminuted flint; 360 grams of sodium silicate 60° Bé.; and 45 cc. of water are intimately mixed, formed into the desired shape, and baked according to the procedure set forth under Example I.

Test bars thus made up according to the above formula exhibited a modulus of rupture in the dry condition of 2980 lbs. and in the wet condition, after 16 hours immersion in water, a modulus of rupture of 2750 lbs., representing a loss of 7.7%. The slightly lower wet strength does not indicate that any bond was lost due to leaching. In connection with this invention it has been discovered that a loss of less than 10% in strength for bars in the wet condition is usually caused by a temporary softening action of the water. When such bars are dried the strength is again equal to or slightly better than that of bars which have not been in contact with water.

The foregoing examples have employed as the granular material to be bonded by the new cement aluminum oxide in the form of abrasive grain. As set forth earlier in the specification, the new cement is applicable to the bonding of any inert granular material and includes other abrasive materials, such for example as silicon carbide. The use of the new cement in bonding silicon carbide is illustrated in the following:

*Example V*

5400 grams of silicon carbide—80 mesh; 75 grams of magnesium oxide; 115 grams of diatomaceous earth; 30 grams of zinc oxide; 20 grams of flint; 360 grams of sodium silicate 60° Bé.; and 60 cc. of water are intimately mixed according to the procedure set forth under Example I. In this case however the ingredients are not pressed but merely tamped into molds and the molds are closed during the baking operation. Test bars made up of this formula and by this method exhibited a modulus of rupture in the dry condition of 2370 lbs. and in the wet condition after 16 hours immersion in water a modulus of rupture of 2200 lbs., representing a loss of 7.2%.

The advantages in bonding silicon carbide afforded by the present invention are indicated by a comparison of the above results with the results of bonding silicon carbide by the best customary process wherein test bars exhibited in the dry condition a modulus of rupture of 2180 lbs. and in the wet condition after 16 hours immersion in water a modulus of rupture of 1500 lbs., representing a loss of 31.2%.

The magnesium oxide used in the foregoing examples consists of a material calcined at about 800° C. Calcination may also be carried out between 800° C.–1100° C. with equally good results. The reactivity of magnesium oxide is controlled by the temperature of calcination, but the invention is not limited to the use of magnesia calcined at any particular temperature and it has been found that magnesia calcined at either a higher or lower temperature may be used. It has also been found that magnesium oxide may be partially hydrated and still maintain the characteristics of the improved cement. Furthermore, other sources of magnesium oxide may be employed in the mix. For example, it has been found that finely powdered magnesium hydroxide may be used to replace the technical magnesium oxide. The use of this material is illustrated in the following:

*Example VI*

Aluminum oxide—80 grit was bonded by a cement having the formula magnesium hydroxide 24%; diatomaceous earth 9.5%; zinc oxide 9.5%; sodium silicate 60° Bé. 57%, in the ratio of 90% granular material and 10% bond. Test bars made up by this formula and following the procedure of Example I exhibited a modulus of rupture in the dry condition of 2800 lbs. and in the wet condition after immersion in water for 16 hours of 2620 lbs., representing a loss of 6.4%.

For simplification the term magnesia will be used to designate magnesium oxide, hydroxide, or any other suitable material containing MgO in reactive form.

It will be noted that in the foregoing examples an essential ingredient of the mix is diatomaceous earth, a form of amorphous silica. The term amorphous silica is used herein to designate materials of the opal family. These materials are hydrous silica and are amorphous in nature. Relatively common minerals which are of this family and suitable for the purposes of this invention because of their cheapness and occurrence in quantity, are diatomaceous earth and the mineral geyserite. An artificially formed member of the opal group, silica gel, may also be used. In connection with this invention it has been found that amorphous silica is an essential ingredient of the formula in producing cements of high strength and water resistance and that crystalline varieties of silica cannot be used to replace the amorphous variety. The reasons for this difference in the performance of the two materials is uncertain. Since they are both otherwise apparently entirely inert, the difference may be due to their unlike physical state of aggregation or to the relative solubility of the amorphous material in alkalies, as compared to the slight solubility of the crystalline material.

The foregoing examples have all used as the amorphous silica, diatomaceous earth. As stated above other forms of amorphous silica, such as silica gel and geyserite may also be used.

Silica gel may be prepared by adding hydrochloric acid to a sodium silicate solution, washing the precipitated gel free from acid and replacing the water in the gel with alcohol. The mass may then be heated under pressure to above the critical temperature of alcohol and then the pressure released. In this manner an extremely light and fluffy material is produced. It may contain a small amount of carbon due to cracking of the alcohol and may be calcined to 800° C. to burn off the carbon, but this is not necessary. An illustration of the use of this material is afforded by the following:

*Example VII*

A cement having the following formula:

|  | Per cent |
|---|---|
| Silica gel | 10 |
| MgO | 20 |
| Zinc oxide | 10 |
| Sodium silicate | 60 | is mixed with the fused alumina—80 grit in the proportion 10% cement, 90% alumina, and pressed and baked according to the procedure set forth in Example I. Test bars so made exhibited a modulus of rupture of 3040 lbs. in the dry condition and a modulus of rupture in the wet condition after immersion in water for 16 hours of 2950 lbs., a loss of 3%.

The use of geyserite as the amorphous silica in producing the new cement may be illustrated by the following:

*Example VIII*

The geyserite is first pulverized and then treated with hydrochloric acid and washed free from acid. Using this material as the amorphous silica, 10 parts of aluminum oxide abrasive grain—80 grit are bonded with 1 part of a cement having the following formula:

|  | Per cent |
|---|---|
| Geyserite | 10 |
| Magnesia | 20 |
| Zinc oxide | 10 |
| Sodium silicate (60° Bé.) | 60 |

The material is mixed and pressed according to the procedure given under Example I. Test bars made according to this procedure from the above formula exhibited a modulus of rupture in the dry condition of 2570 lbs. and a modulus of rupture in the wet condition after 16 hours immersion in water of 2450 lbs., a loss of 4.7%.

Where the modifier of the alkali silicate consists of amorphous silica and magnesia, each component may be varied as much as between 10 and 90% of the combination to obtain results superior to those obtained with the prior processes, although the best results are obtained within the range of 40 to 80% magnesia and 20 to 60% amorphous silica.

The zinc oxide may be substituted in the modifier for part of the combination. This substitution may take place at the expense of both ingredients to the same degree or for each ingredient in different degrees, or may take place entirely at the expense of one of the original ingredients if that ingredient is thereby maintained in the modifier in sufficient proportion.

The amount of zinc oxide to be substituted in the modifier may vary within wide limits. Under the manufacturing conditions described above however, the best results were obtained if not more than 40% of the modifier consists of zinc oxide. In the production of bonded abrasive articles by means of an alkali silicate bond modified by the addition of magnesium oxide, amorphous silica and zinc oxide, the best results are obtained when the modifier consists of 40 to 70% magnesia, 10 to 50% amorphous silica and 10 to 30% zinc oxide, although other proportions may be used advantageously and are within the scope of the invention. However, it is by no means necessary that the magnesia and amorphous silica constitute a large proportion of the modifying agent. Thus a cement showing greatly improved results over the cement made by prior processes is produced by using the following proportions of ingredients in the modifier:

|  | Parts |
|---|---|
| Zinc oxide | 10 |
| Magnesium oxide | 1 |
| Diatomaceous earth | 1 |
| Flint | 4 |

In the foregoing examples the alkali silicate consisted of sodium silicate with a water content of 46% and a ratio of Na₂O to SiO₂ of 1 to 2. Other alkali silicates either simple or complex may be used, as for example, potassium silicate. Furthermore the ratio of alkali to silica in the sodium silicate may be varied without losing the benefit of the present invention.

It will be noted in the foregoing examples that the ratio of modifier to sodium silicate is 2 to 3. In general the preferred ratio will depend upon the particles to be bonded or on the parts to be joined or the type of alkali silicate which is used and on the drying and baking procedure which is followed. The invention therefore is not limited to any particular ratio of modifier to the alkali silicate. Referring specifically to the bonding of abrasive granules into bonded abrasive articles, it has been found that in following the above described procedure that equally good results may be obtained using ratios of modifier to alkali silicate varying between 5 to 9 and 7 to 9, as were obtained using the exact ratio of 2 to 3.

The cement may be prepared in a dry condition using a soluble silicate in the powdered form. Since the ingredients of the modifier are powders the cement may be prepared in a powdered condition and stored indefinitely, being mixed with water in the proper proportions for use when desired. Inasmuch 60° Bé. sodium silicate is approximately 46% water the ratio of 2:3 would become, in mixing the ingredients in the dry form, a ratio of 5 parts modifier to 4 parts anhydrous sodium silicate. If the sodium silicate contains some water of crystallization the ratio will be adjusted to preserve the 5 to 4 relationship.

The principal advantage in the use of the new cement lies in its great resistance to the softening and solvent action of water. Articles bonded with this cement have been immersed in water for as long as 350 hours without permanent loss in strength. The hardness of articles made with this cement after immersion followed by drying is changed very little and is usually somewhat increased. This assures a product of substantially uniform and consistent quality. For example, in a bonded abrasive article it assures a consistent degree of grinding action.

The new bond has a number of other distinct advantages over the sodium silicate bond heretofore employed. These advantages do not necessarily reside or grow out of the use of a new cement for any particular purpose but since the present invention is being described specifically in connection with the application of a new cement to the production of bonded abrasive articles, the advantages will be described with reference to this use.

Prior to the present invention in making bonded abrasive articles using the prior available sodium silicate cement, it has been necessary to vary the bond formula depending upon the type and size of abrasive particles used, on the hardness required, and on the size of the article to be made. The present invention simplifies this practice because the same bond formula may be used regardless of bond percentage, type and size of grain, and size of article. A further advantage in connection with bonding abrasive grain and similar granular material lies in the ease of manufacturing the articles. Under prior practice there was great difficulty in tamping articles which had a high bond content in the mold due to the stickiness of the mix. Mixes made using the new cement exhibit greater ease of handling in this respect and the mixes at the same time remain workable for a long time. When protected from drying out, mixes have been kept for 30 hours without congealing.

A further advantage in the use of the new cement lies in the fact that little drying of the green, pressed or tamped or otherwise cemented article is required. Referring again to the bonding of granular materials the pressed articles may be placed in the baking oven at 275° F. after standing for about one hour at room temperature subsequent to pressing and in many cases this gives improved results over the old practice wherein drying for 48 hours was often necessary.

In bonding granular material into large articles, serious losses were encountered in prior practice due to bloating and cracking. With the use of the new bond these losses are entirely eliminated.

In the use of the new bond in the manufacture of bonded abrasive articles, it has been found that the hardness of articles made with the cement is considerably increased with the result that the same hardness may be obtained in the new article with a smaller percentage of bond. Consequently in abrasive articles so made there is less interference by the bond in the cutting action of the abrasive particles.

Moreover in the bonding of granular material it is possible to increase the maximum obtainable hardness considerably by the use of the new cement. This makes possible new uses for articles made with this type of cement. This increase in the maximum hardness is most marked in articles made of granular material consisting of silicon carbide. Heretofore it has been practically impossible to make even a fairly hard sodium silicate bonded silicon carbide article. With the improved cement of the present invention, articles have been made of silicon carbide which were at least as hard as those made by a vitrifying process.

It will thus be seen that the present invention provides a new cement which is distinctly superior to previous alkali silicate cements and extends the field of usefulness of articles made up by the use of this cement and widens the field of usefulness of the cement itself in binding materials not heretofore used in connection with alkali silicate cement. The new cement is useful in cementing unitary objects together to build up a composite structure whether the unitary articles be in the form of abrasive or other granular material or in the form of larger articles such as bricks or other ceramic articles, for example abrasive segments such as are used in the production of segmental pulp wheels. Also the cement is useful in the joining together of a limited number of articles, for example the composite structure referred to may consist of two parts which have been joined along one surface by the use of the new cement. It is apparent however, from the foregoing discussion, that the use of the new cement permits the production of composite structures which are not only superior to similar structures heretofore produced by means of alkali silicate cement, but which possess new qualities not possessed by the said heretofore produced articles. For example, by means of the present invention it is possible to produce silicon carbide bonded abrasive articles which are at least as strong as similar vitrified articles. This greatly increased hardness and strength as well as the substantially increased water resistance of the article widens the field of usefulness of silicon carbide articles bonded by an alkali silicate cement, so that it may be said that the composite structure is a new article.

The present invention has been described and illustrated specifically by reference to the production of bonded abrasive articles. It is obvious however that the new cement is adapted for bonding together a wide variety of materials of various shapes and sizes and it is intended that the present invention include within its scope the use of the cement for binding such articles.

I claim:

1. A bonded article comprising granular material and a binder therefor consisting of the reaction products of an alkali silicate and a modifier comprising magnesia and silica gel.

2. A cement comprising in intimate mixture an alkali silicate, magnesia, and silica gel.

3. A bonded article consisting of granular material and a binder therefor, said binder consisting of the thermal reaction products, at temperatures of approximately 275°–385° F., of from 55 to 65 per cent of an alkali silicate, having an alkali-silica ratio of approximately 1:2, and from 35 to 45 per cent of a modifier consisting of 40 to 80 per cent magnesia, 10 to 60 per cent amorphous silica, 0 to 30 per cent zinc oxide, and 0 to 25 per cent finely divided inert filler, the said article having a decrease in strength of less than 20 per cent after prolonged immersion in water.

4. A bonded articles consisting of granular material and a binder therefor, said binder consisting of the thermal reaction products, at temperatures of approximately 275°–385° F., of from 55 to 65 per cent of an alkali silicate, having an alkali-silica ratio of approximately 1:2, and from 35 to 45 per cent of a modifier consisting of 40 to 80 per cent magnesia, 10 to 60 per cent diatomaceous earth, 0 to 30 per cent zinc oxide, and 0 to 25 per cent finely divided inert filler, the said article having a decrease in strength of less than 20 per cent after prolonged immersion in water.

5. A bonded article consisting of granular material and a binder therefor, said binder consisting of the thermal reaction products, at temperatures of approximately 275°–385° F., of from 55 to 65 per cent of an alkali silicate, having an alkali-silica ratio of approximately 1:2, and from 35 to 45 per cent of a modifier consisting of 40 to 80 per cent magnesia, 10 to 60 per cent geyserite, 0 to 30 per cent zinc oxide, and 0 to 25 per cent finely divided inert filler, the said article having a decrease in strength of less than 20 per cent after prolonged immersion in water.

PETER DE LEEUW.